Nov. 4, 1941.  J. ROGOFF  2,261,414
ELECTRICAL CONDUCTOR SPLICER
Filed Feb. 23, 1940
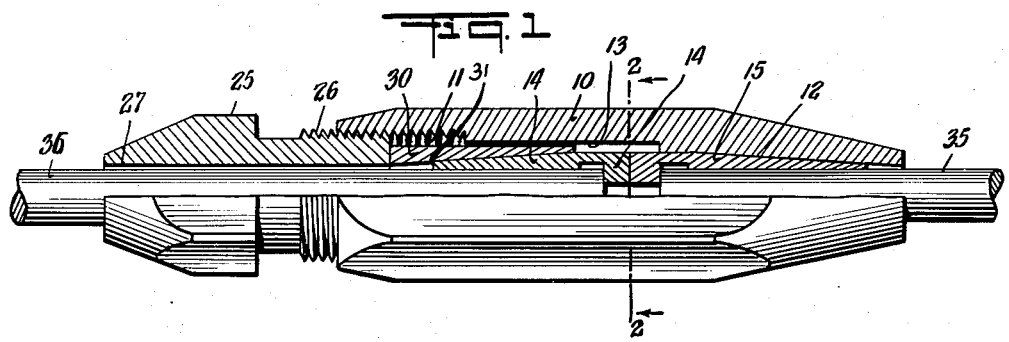
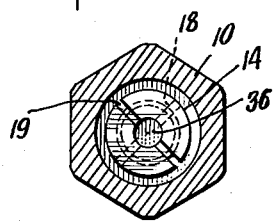
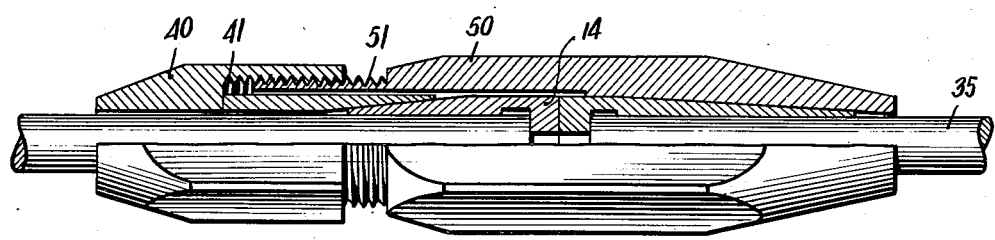
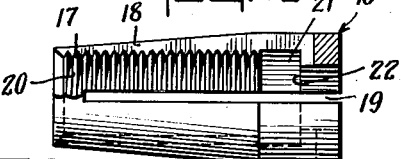
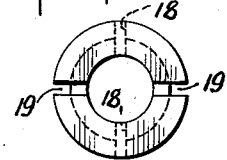
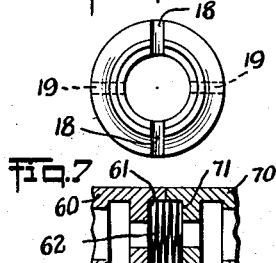
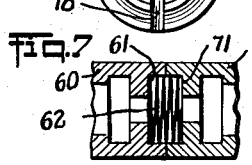
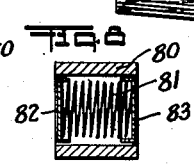
INVENTOR.
Julian Rogoff
BY Harry Ernest Rubens
ATTORNEY.

Patented Nov. 4, 1941

2,261,414

UNITED STATES PATENT OFFICE 2,261,414

ELECTRICAL CONDUCTOR SPLICER

Julian Rogoff, New York, N. Y.

Application February 23, 1940, Serial No. 320,469

1 Claim. (Cl. 287—75)

My invention relates to electrical connectors of the splicing type wire splicers for electrically and mechanically connecting two electrical conductors in a substantially straight line.

In electrical utility construction practice it is necessary to splice the ends of wires comprising overhead transmission or distribution lines. Sometimes these splices are made in the actual span of the wire and such splices are subject to considerable tension. At other times splices are made at the point of support where the wire is "jumpered" around the pole or tower supporting it. A splice in such a "jumper" has practically no mechanical tension on it, but it must have a high electrical efficiency. Several types of splicing connectors have heretofore been used. It is of decided advantage to electric utility crews to have a single type of wire splicer available which will be suitable for both purposes, and accordingly an object of my invention is to provide a positive electrical connection between the conductors, even when the conductors have no mechanical tension exerted thereon.

Very often it is necessary to splice a line at a point adjacent a pole or tower with the line in the air. The general practice is to hold the line in place with a "come-a-long" and block and tackle, then to connect the wire with a wire splicer and finally to remove the come-a-long and block and tackle. To tighten a connector under such circumstances is a very inconvenient procedure and therefore a connector which requires only a single nut to be tightened in order to grip both conductor ends simultaneously, is of decided advantage. Another object of my invention, therefore, is to enable both conductors to be gripped simultaneously by simply tightening a single nut. Another object of my invention is to provide a connector in which the mechanical grip will increase in proportion to the amount of tension exerted on the conductors so that the conductors themselves will break before they pull out of the connector.

It is important to avoid any tendency of the connector to cause the conductor to twist while the connector is being tightened. At the same time it is also important to avoid any torsional stress on the gripping means which would tend to distort them and thereby prevent their proper functioning, and also make the connector unsuitable for reuse.

A further object therefore consists in providing a bushing which transmits the tightening force of the nut into a direct axial thrust on the gripping means. Means should be provided to prevent burred ends of wires from spreading the flexible cones which I prefer to use and causing them to become inoperative.

Still another object therefore is to provide undercut recesses adjacent the back ends of the cones into which the burred ends may fit.

A wire end should not pass through one cone and into the other, and thereby prevent proper grip on the second wire. An additional object consists in solving this problem by providing stops at the back ends of the cones.

Still another object of my invention is to provide a connector which will accomplish the foregoing objects which will be simple in operation, which will have a minimum number of parts, and which will be inexpensive to manufacture.

I accomplish these and other objects and obtain my new results as will be apparent from the device described in the following specification, particularly pointed out in the attached claim, and illustrated in the accompanying drawing, in which:

Fig. 1 is a longitudinal partially sectioned view of my preferred embodiment.

Fig. 2 is a transverse sectional view taken in the plane of 2—2 in Fig. 1, and in the direction of the arrows.

Fig. 3 is a modification with the position of the threads reversed.

Figs. 4, 5, and 6, are various views of the flexible cone.

Fig. 7 indicates recesses formed in the ends of the cones for the insertion of a spring.

Fig. 8 illustrates a separable spring and bushing.

In the drawing, reference numeral 10 designates the body of the preferred form of nut connector. It is tubular in construction and provided with an internally threaded aperture 11, at one end thereof, and a tapered section 12 at the other end. A hollow recess 13 is located between the two ends which will permit the conductor gripping parts to be freely inserted therethrough, from the threaded end.

These conductor gripping parts preferably consist of flexible cones 14 and 15, of familiar construction, illustrated on detail in Figs. 4 to 6. Each cone consists of a cylindrical body 16, having a tapered outer wall 17, adapted to fit into corresponding tapered sections of the connector, such as 12 referred to supra.

Two sets of slots 18 and 19 are alternately cut into the walls, from each end thereof, giving the relatively thin walls a collapsibility which will permit a conductor inserted therein to be gripped by the teeth 20 formed on the inner walls.

Chamber 21 is formed therein, adjacent the end of the inserted conductor to accommodate frayed ends thereof, and the wall 22 acts as a stop to limit the movement of the cable therein.

A nut 25, threaded at 26 to match the threaded section 11, of the body 10, is hollowed at 27 to permit the cable to be inserted therethrough. A hollow bushing 30 with a diameter less than the hollow recess 13 of the body 10, enables the conductor to pass similarly therethrough. The inner surface 31 of the bushing is also tapered, corresponding to section 12 of the body, to accommodate the flexible cone 14 positioned therein.

In operation, the cable indicated at 35 is inserted into the connector body 10, and conductor 36 is passed through the hollow nut 25.

Cone 14 is inserted into bushing 30, and the two positioned over the end of conductor 36. Cone 15 is similarly positioned over conductor 35.

The conductor body is moved until cone 15 is engaged by tapered section 12, and the two cones abut each other.

The nut 25 is then tightened into the end of the connector body until the two conductors are satisfactorily secured therein.

In Fig. 3, nut 40 is provided with an internally threaded recess 41, and connector body 50 provided with a corresponding externally threaded neck 51, just the reverse of that shown in Fig. 1. Otherwise the parts are identical.

In Figs. 7 and 8, two means are illustrated for providing spring tension between the ends of the cones.

Thus in Fig. 7, the recesses 61 and 71 are formed in the adjacent ends of cones 60 and 70, with a spring 62 positioned therein.

In Fig. 8 a washer 80 is provided within a spring 81, in the hollow portion thereof. Caps 82 and 83 may be used to cover the ends of the springs.

I have in the foregoing described and illustrated a device in which conductors can be mounted in substantially the same straight line, and by a single tightening means, lock both conductors in position. This is the essence of my invention and while flexible cones are shown, other familiar types of conductor gripping means may be employed which may be simultaneously locked by a single means for securing two conductors mounted in a substantially straight line.

By my invention, I am able to lock the two conductors securely in position, independently of the tension in the conductors themselves.

Hexagonal or non-circular material is preferably used to form the body of my connector to aid in tightening the nut thereon.

I have thus described my invention, but I desire it understood that it is not confined to the particular forms or uses shown and described, the same being merely illustrative, and that the invention may be carried out in other ways without departing from the spirit of my invention, and therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

What I claim and desire to secure by Letters Patent is as follows:

An electrical connector for electrically transmitting current from one conductor to another mounted in substantially the same longitudinal axis comprising a tubular metallic body, having an internally formed taper at one end thereof and threaded at the other end thereof with the smallest diameter of the taper immediately adjacent the end of the body; a pair of oppositely disposed conductor gripping and current transmitting slotted metallic cones, one of which is positioned in the taper formed in the end of the connector body and the other so positioned as to transmit thrust to the first mentioned cone; a hollow tapered sleeve for engagement with the said other flexible cone; hollow threaded means for attachment to the threaded end of the connector body for longitudinally applying pressure to said sleeve and through said sleeve from one flexible cone to the other.

JULIAN ROGOFF.